United States Patent [19]

Zumstein

[11] Patent Number: 5,079,876
[45] Date of Patent: Jan. 14, 1992

[54] METHOD AND INSTALLATION FOR PROCESSING GLASS PLATES

[75] Inventor: Ernst Zumstein, Kirchberg, Switzerland

[73] Assignee: Bystronic Maschinen AG, Butzberg, Switzerland

[21] Appl. No.: 530,750

[22] Filed: May 30, 1990

[30] Foreign Application Priority Data

Jun. 1, 1989 [CH] Switzerland .............. 02 061/89

[51] Int. Cl.⁵ ............................................. B24B 1/00
[52] U.S. Cl. ........................... 51/283 R; 51/283 E; 51/100 R; 51/105 EC; 225/93.5
[58] Field of Search ............... 51/283 R, 283 E, 5 R, 51/5 B, 5 C, 215 E, 98 R, 100 R, 105 R, 105 EC, 165.71, 165.74, 165.75, 165.76, 165.77, 240 GB, 273, 235; 125/23.01; 225/2, 93.5, 94, 103, 96.5

[56] References Cited
U.S. PATENT DOCUMENTS 4,698,088 10/1987 Bando .................. 225/93.5
4,705,438 11/1987 Zimmerman et al. ........... 51/235

FOREIGN PATENT DOCUMENTS 1054945 1/1967 United Kingdom .

Primary Examiner—Bruce M. Kisliuk
Assistant Examiner—Eileen Morgan
Attorney, Agent, or Firm—Marks Murase & White

[57] ABSTRACT

Roughly precut glass plates are delivered to a cutting and breaking station where they are cut and broken while invariably mounted. For this purpose, a processing head having a cutting head and a mechanical or thermal breaking system is provided which in a sequence of operations produces a cutting line and relief incisions and then breaks off the plate edges extending on the outside of said cutting line. As the plate is cut to shape, it is transferred, in a predetermined position, to a grinding station, where the plate edge is ground. Effecting the cutting and the breaking operation in one location allows a considerable simplification of the installation and an improved utilisation of all parts of the system. Positioning by means of stops as well as conversions of breaking tool adjustments for different plate shapes are no longer necessary. Programming of the various processing operations is particularly simple.

12 Claims, 2 Drawing Sheets

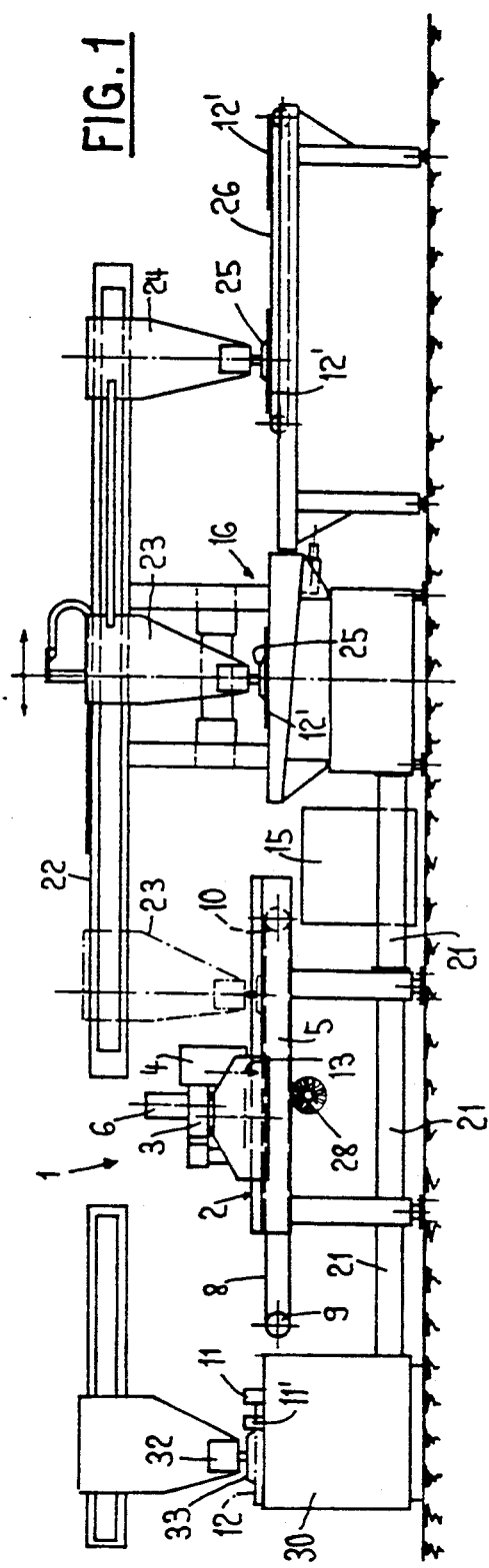
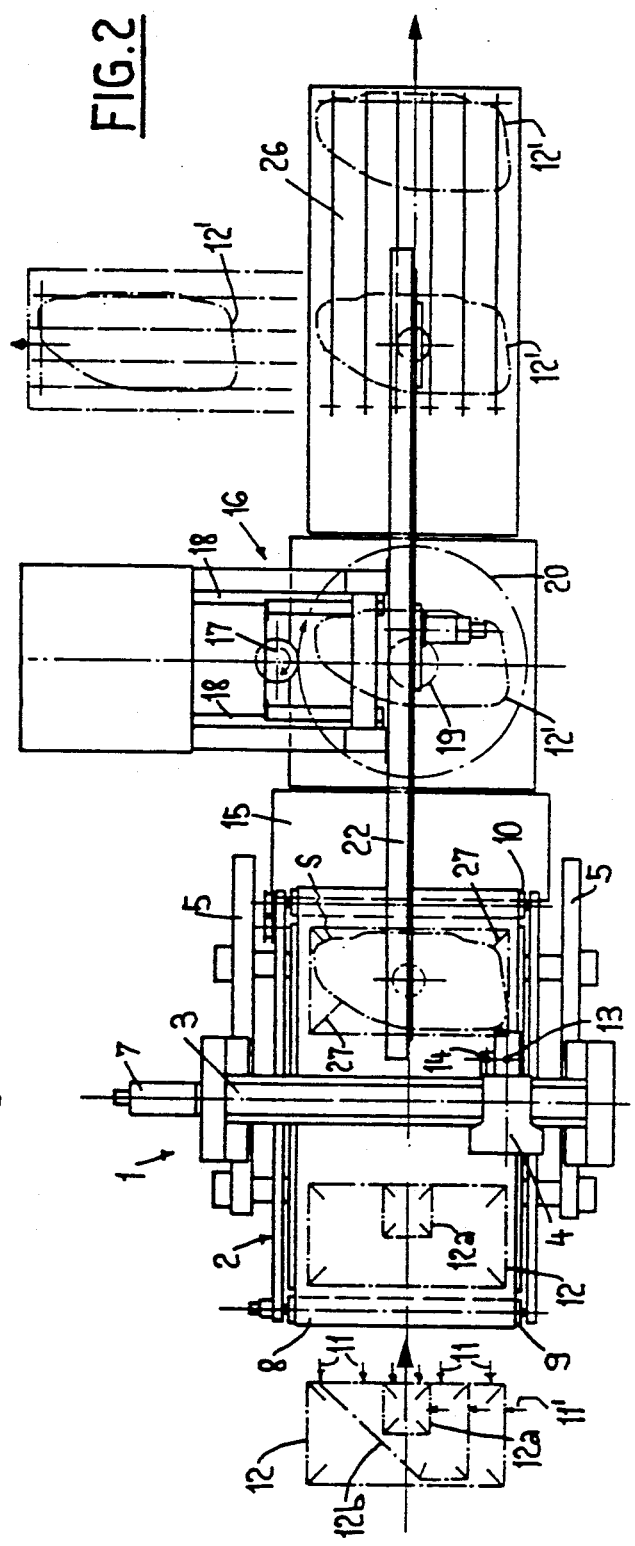

METHOD AND INSTALLATION FOR PROCESSING GLASS PLATES

BACKGROUND OF THE INVENTION

The present invention refers to a method for processing glass plates, e.g. windscreens for automobiles, comprising cutting said glass blanks along a line which corresponds to the final plate shape, then breaking off the projecting edge portion of said blank along the cutting line and finally, grinding the plate edge. It has been common practice to effect the different working operations separately, i.e. in different machines, respectively working stations of an installation, conveying means for the blanks, respectively the partially processed plates being provided between such stations. In this case, space consumption and expenditure for system parts are considerable even if the different stations are disposed one after another in a straight line and at an equal distance and the plates may be conveyed synchronously by means of rigidly connected grippers. Moreover, the capacity of the different stations is poorly used since cutting and breaking can be effected in a substantially shorter time than grinding of the plate edges. Further, a corresponding conversion of the breaking station is currently necessary in the case of a pattern change.

SUMMARY OF THE INVENTION

Accordingly, it is the object of the present invention to carry out processing in such a manner as to reduce the number of system parts and the conversion times and consequently, to provide a more compact and less expensive installation the system components of which may however be used more efficiently. According to the invention, this object is attained by a method wherein cutting and breaking is effected with said plate mounted in an unchanged position. As a result, there are no longer three approximately synchronous working cycles of equal duration taking place in the known manner, but cutting and breaking is effected in two cycles which have the same overall duration as grinding. Still it is possible to integrate control of the different movements to a great extent, respectively to derive such control from a common program since the respective tools have to effect similar movements along the plate edge for cutting, breaking, and grinding. Yet, as mentioned, these programs are not actually synchronised in so far as the cutting and breaking operations each take only half as long as grinding.

The concept of the invention considerably simplifies the transport of the glass plates because the glass plate needs to be conveyed from the cutting and breaking operation, which is carried out in the same position, to another working station for grinding only once. This yields not only an economy of system parts, but the probability of positioning errors during the conveyance from one station to another is correspondingly reduced. Preferably, the cutting, breaking, and grinding operations may be effected with reference to one and the same center. The concept of the invention considerably reduces conversion times of the installation when the shape of the processed plate is changed since any positioning of stops and of breaking tools is eliminated.

With the concept of the invention, a system for processing glass plates is obtained which features a station having a single mounting location for glass plates and a common processing head comprising a cutting tool and a breaking system. The obtained simplification is particularly evidenced by the fact that the cutting and the breaking operations may be effected in immediate succession by means of a single processing head, respectively its drive means, simply by selecting the respective control program. It is thus only necessary for the cutting tool and the breaking system to be individually fed towards the plate and brought into their effective positions. A positioning of delivered blanks is only required once and without particular precision, corresponding positioning stops being disposed before the cutting and breaking station and the plate being subsequently processed without any new positioning.

BRIEF DESCRIPTION OF THE DRAWINGS

The invention is now explained in more detail with reference to an embodiment as illustrated in the drawing, wherein
FIG. 1 shows a side view of the system;
FIG. 2 shows a plan view thereof.

DETAILED DESCRIPTION OF THE PREFERRED EMBODIMENT

Figure 3:
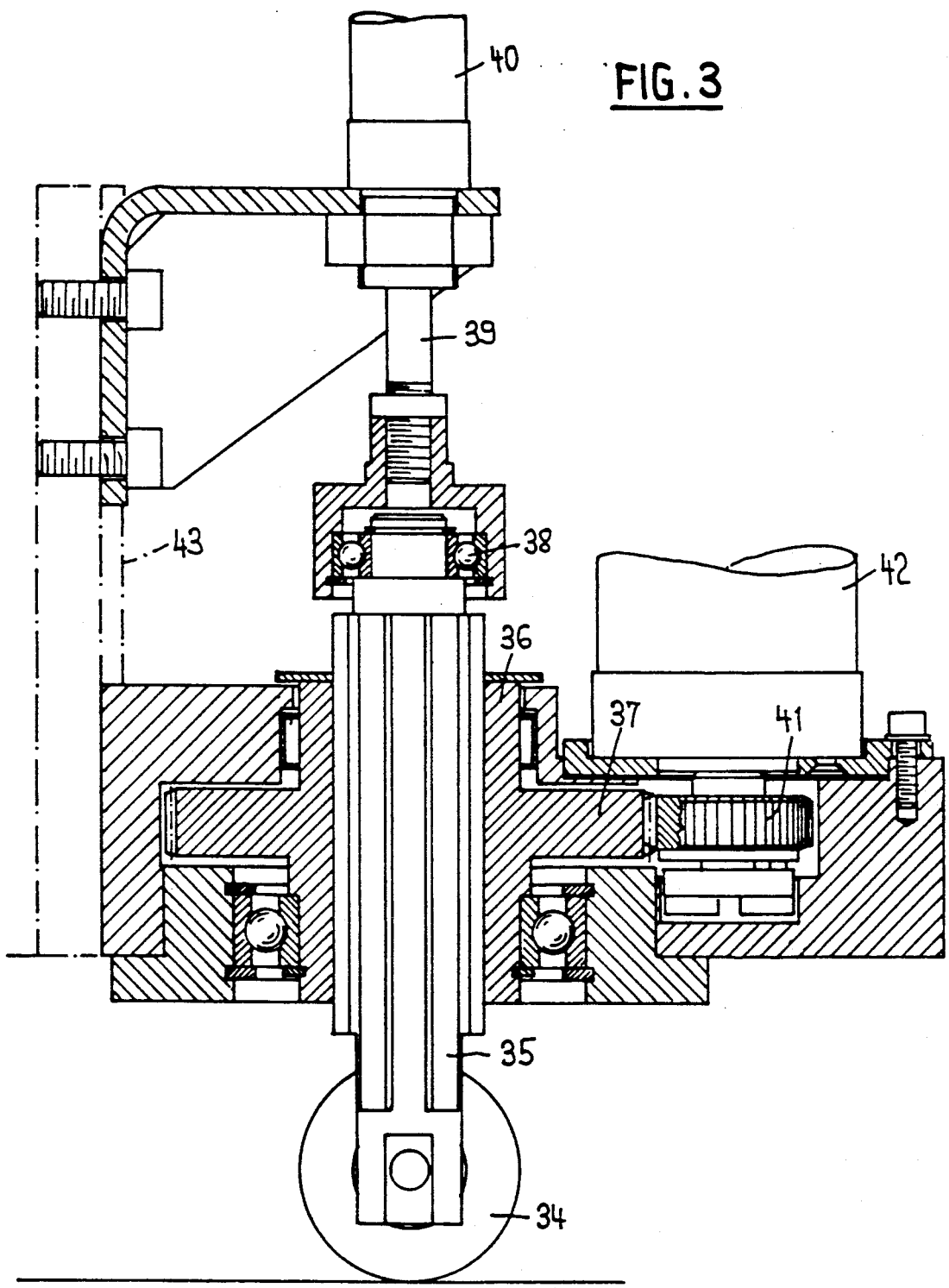
FIG. 3 shows the construction of the breaking tool.

The illustrated installation comprises a cutting and breaking station 1. Above table 2, a cutting support 3 is disposed, along which a processing head 4 is guided. Cutting support 3 is displaceable along guides 5 in such a manner that processing head 4 can be moved into any position within a certain area according to longitudinal and transversal coordinates. CNC controlled drive motors for the adjustment of processing head 4 in the longitudinal and the transversal direction are not shown in detail, and they correspond to state of the art drives. In FIGS. 1 and 2, only drive motors 6 and 7 for longitudinal and transversal displacement are schematically shown.

A conveyor belt 8 runs around table 2 and passes over a pulley 9 and a driving pulley 10. This conveyor belt can be advanced by exactly measured lengths in order to bring glass plates into the working position. Conveyor belt 8 is made of a perforated, resilient material. Glass blanks to be processed of any size and shape are delivered onto a table 30 which is placed in front of table 2, and they are prepositioned by means of longitudinal stops 11 and side stops 11'. Table 30 is not shown in FIG. 2, but different shapes of glass blanks 12, 12a and 12b as well as longitudinal stops 11 and an adjustable side stop 11' are schematically illustrated. Above tables 2 and 30, a guide 31 is arranged along which a transfer head 32 is displaceable. By means of its suction disk or a plurality of vacuum cups, said transfer head can lift up glass blanks 12 and depose them in a determined position on conveyor belt 8. One particular advantage of this arrangement is that the blanks are never displaced on any support for positioning, neither in the cutting and breaking station nor in the grinding station, and thus cannot be damaged by glass dust or splinters.

On processing head 4, a cutting head 13 is mounted having a cutting wheel (not shown) at its lower end, said cutting head being fed towards a glass plate therebelow and displaced along a prescribed cutting line S. Moreover, a mechanical breaking tool 14 is attached to processing head 4, which can be lowered upon an underlying glass plate in order to break off the edge portion projecting beyond cutting line S.

The rear end of conveyor belt 8, on the right in FIGS. 1 and 2, is situated above a container 15 for collecting detached glass fragments.

Behind cutting and breaking station 1, a grinding station 16 is disposed in which the edges of a glass plate 12' are worked by means of a grinding disk 17. Grinding disk 17, with its drive motor (not shown), is mounted in a grinding head which is displaceable along guides 18. Meanwhile, the glass plate to be ground 12' is aspirated on a rotary table 19 which during processing of the plate edge is set into rotation in such a manner that working takes place according to polar coordinates. Circle 20 indicates the greatest possible working radius with reference to the center of rotation. Besides, the construction and operation of such grinding sections are known and need not be further explained.

Table 30, cutting and breaking station 1 and grinding station 16 are rigidly connected to each other by profiles 21, and a guiding rail 22, along which two transfer heads 23 and 24 may be displaced, extends above the two stations. Each of the two transfer heads is provided with a suction disk 25 which serves to seize and lift a glass plate and to transfer it from one station to another, respectively from grinding station 16 either to a conveyor belt 26 or, as the case may be, to e.g. a drilling station. It appears in FIG. 2 that finished glass plates may be removed either longitudinally or transversely with respect to the previous direction of conveyance.

FIG. 3 illustrates the construction of breaking tool 14. It is provided with a breaking wheel 34 which is rotatably journalled in a ram 35. Ram 35 is provided with grooves and guided in hub 36 of a gearwheel 37 in an axially displaceable but rotationally rigid manner. The upper end of ram 35 is rotatably coupled to the lower end of a piston rod 39 of double action cylinder 40. A pinion 41 fitted onto the shaft of control motor 42 meshes with gear-wheel 37. The bearing of gear-wheel 37 and cylinder 40 are linked with a common support 43. Breaking wheel 34 may be set down and lifted off by means of cylinder 40, and at the same time, the pressure applied to the plate edge by the breaking wheel may be adjusted. Motor 42 allows continuous orientation of the breaking wheel in such a manner that it can roll along cutting line S on the outside.

Cutting tool 13 is constructed accordingly with the difference that a cutting wheel is provided instead of a breaking wheel. Correspondingly, the cutting wheel may also be lifted off and set down with adjustable pressure, and it may also be continuously oriented such as to roll in the cutting direction.

Operation of the illustrated device largely follows from the preceding description already. Roughly precut glass plates 12, 12a or 12b are delivered onto table 30 and then to conveyor belt 8 from the left in FIG. 2, and they are advanced by a predetermined distance by conveyor belt 8 to the working position on the right of cutting support 3 as shown in FIG. 2. The positioning precision thus obtained is sufficient since only now the blank is cut into a plate of the ultimately desired shape and the edges are broken off. As this position of the blank 12 is reached, a vacuum is created in this working area below the conveyor belt, so that the blank is firmly sucked onto the perforated conveyor belt and thus held motionless. Simultaneously, the conveyor belt is also sucked onto table 2. According to a first control program, processing head 4 respectively cutting head 13 with its non-represented cutting wheel is now guided along cutting line S which corresponds to the edge shape of plate 12' to be produced. At the same time or in a second, separate working operation, relief incisions 27 are effected which subsequently allow a clean breaking of the excess plate edges. As soon as cutting line S is accomplished over the entire circumference and relief incisions 27 have also been effected, processing head 4 is guided along the circumference of the blank according to a further program which has a similar sequence as the program for producing the cutting line, in order to break off this edge by mechanical breaking tool 14 resp. 34 on the resilient conveyor belt. When the breaking operation is finished, transfer head 23 takes over the glass plate 12', which has now been cut to shape, in a determined position and transfers it to suction disk 19 of grinding station 16. As removal of the glass plate and its insertion into the grinding section is effected with the highest precision, no renewed positioning of the same is required in the grinding station. In other words, the working positions of the plate in the cutting and breaking station and in the grinding station, respectively, are precisely related, and no new positioning is needed. Accordingly, processing takes place with reference to the same predetermined processing center. Not only the installation is thereby simplified, but the control programs for cutting, breaking and grinding can be derived from one basic program from the start, depending on the prescribed plate shape.

After transfer to the grinding station, the shaped plate is now ground and transferred by transfer head 24 to conveyor belt 26 or another corresponding conveying means for removal after the end of the grinding operation.

It follows from the above description that in practice, the programs for cutting and breaking have to run twice as fast as the program for grinding the plate edge. However, this causes no problems but on the contrary, has the considerable advantage that all parts of the system are optimally used since both the cutting and the breaking operations can be effected substantially faster than the grinding operation even when relief incisions have to be made.

During each advance of a blank plate from the takeover position to the working position of the cutting and breaking station, broken-off glass fragments having previously remained on conveyor belt 8 fall into container 15, and fine glass splinters left on the conveyor belt are removed by a brush 28.

Instead of the mentioned mechanical breaking tool 14, a burner of per se known kind may be provided for thermal breaking, in which case the glass plates have to be supported suitably for thermal breaking in the cutting and breaking station. In a similar manner as the mechanical breaking tool, the burner is guided along cutting line S according to a predetermined program during the breaking operation.

What I claim is:

1. A method for processing glass plates, comprising the steps of cutting a glass blank along a line which corresponds to a final plate shape, breaking off a projecting edge portion of said glass blank along said line and grinding the plate edge, wherein the cutting and breaking steps are effected with said plate mounted in an unchanged position and the cutting and breaking steps are effected by the same processing head using a single drive for both cutting and breaking.

2. A method according to claim 1, wherein cutting and breaking are effected by means of corresponding control programs.

3. A method according to claim 1, wherein said glass plate is cut while resting on a support, and wherein it is broken mechanically or thermally.

4. A method according to claim 1, wherein changes of the plate shape to be cut and broken are effected by a program change exclusively, and without mechanical conversions.

5. A method according to claim 1, wherein grinding also is effected according to a corresponding program, the duration of said grinding program being about equal to that of the cutting and breaking program.

6. A method according to claim 1, wherein cutting, breaking and grinding is effected with reference to one and the same determined processing center.

7. A method for processing glass plates comprising the steps of cutting said plates along a line which corresponds to a final plate shape, breaking off a projecting edge portion of said plate along the cutting line, and grinding the plate edge, wherein the steps of cutting and breaking are performed at one station with one processing head using one single drive for both cutting and breaking.

8. An installation for carrying processing glass plates, comprising stations for cutting, breaking and grinding glass plates, wherein one station having a single mounting location for said glass plates and a common processing head comprising a cutting tool and a breaking system, and wherein said processing head uses one single drive for both cutting and breaking.

9. An installation according to claim 8, wherein a single gripper for transferring said plates from said cutting and breaking station to said grinding station is provided.

10. An installation according to claim 8, wherein said cutting tool and said breaking tool are adapted to be individually fed towards said plate and into their effective positions.

11. An installation according to claim 8, wherein said mounting location comprises a perforated support for said glass plates and therebelow, ducts of a vacuum system.

12. An installation according to claim 8, wherein no positioning means for newly delivered blanks are provided in the cutting and breaking station, and wherein means for preliminary positioning of said blanks and means for the transfer of said prepositioned blanks to said cutting and breaking station in a predetermined position are provided.

* * * * *